Patented July 11, 1950

2,514,979

UNITED STATES PATENT OFFICE 2,514,979

WAX COMPOSITION CONTAINING PROPYLENE-BUTADIENE POLYMER

William R. Turner, Drexel Hill, and Randall G. Heiligmann, Yeadon, Pa., assignors to The Atlantic Refining Company, Philadelphia, Pa., a corporation of Pennsylvania No Drawing. Application April 16, 1947, Serial No. 741,960

3 Claims. (Cl. 260—28.5)

The present invention relates to improved wax compositions, and more particularly to compositions comprising hydrocarbon wax and propylene-butadiene polymers. Such compositions find wide application in laminating or water proofing of paper, cardboard, metal foil, fiber, textiles, and sheeting of various types, when it is necessary to employ waxes or waxy compositions of improved fiber structure and tackiness.

In accordance with the present invention, there is uniformly incorporated in hydrocarbon wax, from about 5% to 50% by weight of a polymer obtained by treating a propylene-butadiene mixture with a Friedel-Crafts catalyst at a temperature between −50° C. and −100° C., the propylene comprising between 40% and 60% by weight of the propylene-butadiene mixture.

The hydrocarbon wax or waxy mixtures which may be employed include crude or refined petroleum waxes having melting points between 110° F. and 200° F., for example refined and scale paraffin waxes, undeoiled or partially deoiled petrolatum waxes, microcrystalline waxes, solvent deoiled petroleum waxes, crude petroleum residuums containing oil, asphaltenes, resins, and wax, or mixtures of two or more thereof, ceresin, ozokerite, and synthetically produced waxy materials derived by cracking, oxidation, hydrogenation, or condensation of petroleum hydrocarbons, or alkylation of aromatic hydrocarbons with long chain aliphatic compounds including alcohols, olefins, olefin polymers, and halogenated hydrocarbons.

The polymers employed in preparing the composition of the present invention are obtained by the polymerization of a mixture of propylene and butadiene, and are generally clear, hard, colorless to yellow brittle solids having a molecular weight between 2000 and 4000, and are soluble in hydrocarbons such as petroleum naphtha, benzene, toluene, oils, waxes, and halogenated hydrocarbons. Iodine numbers of the polymers range from about 125 to 175.

In carrying out the polymerization, dilution of the reactants with an inert solvent or diluent is most advantageous. Solvents or diluents include the lower alkyl halides such as methyl, ethyl, propyl, and isopropyl chlorides, or the corresponding bromides, iodides, and fluorides, chloroform, carbon disulfide, ethane, propane, butane, cycloparaffins such as methylcyclohexane, and petroleum naphtha. The quantity of solvent or diluent may range from 1 to 10 volumes per volume of the reactants, and in most cases from 2 to 5 volumes of solvent will suffice. In utilizing the normally gaseous solvents, superatmospheric pressure may be applied to maintain them in the liquid state.

In operating with active Friedel-Crafts type catalysts, it has been found advantageous to first dissolve or disperse the catalyst in a suitable solvent, such as carbon disulfide or a lower alkyl halide, for example, methyl chloride, ethyl chloride, propyl chloride, or iso-propyl chloride before bringing it into contact with the olefinic mixture to be polymerized. The catalyst solution is most suitably applied in the form of droplets or as a mist or dispersion. Any suitable spraying or atomizing device having jets or orifices of proper restriction may be employed to produce the spray or mist, which may be injected on or under the surface of the reactant mixture. In general, any alkyl halide of suitable freezing point and solvent power may be used as a catalyst solvent, although chlorides are preferred over the corresponding bromides, iodides, and fluorides. Various Friedel-Crafts type catalysts may be satisfactorily employed, including $AlCl_3$, $AlBr_3$, $ZnCl_2$, $TiCl_4$, $SnCl_4$, and $BF_3$, preference being had for $AlCl_3$.

In the practice of the invention, a propylene-butadiene mixture is made up, the propylene comprising from 40% to 60% by weight of the mixture, preferably with the assistance of a suitable solvent or diluent, and the mixture is cooled by indirect heat exchange with a cooling medium to the temperature at which it is desired to conduct the polymerization. The cooled mixture is then introduced into a suitable reaction vessel provided with a cooling jacket or cooling tubes for maintaining the reaction mixture at the desired temperature. Alternatively, the uncooled olefin mixture may be introduced into the reaction vessel and cooled therein by direct contact with a cooling medium such as solid carbon dioxide, liquefied nitrogen, or inert liquefied normally gaseous hydrocarbons such as liquefied ethane or ethylene. Thereafter, a solution of a catalyst in a solvent such as ethyl chloride or carbon disulfide is made up at ordinary temperature. The concentration of the catalyst in the solution may vary between relatively wide limits, concentrations between 0.25% and 1% being satisfactory, although higher concentrations may be utilized, i. e., up to about 5%. The catalyst solution is then cooled by appropriate means such as by the use of carbon dioxide, or liquefied nitrogen, or inert liquefied normally gaseous hydrocarbons, for example, ethane, ethylene, or propane to approximately the temperature at which it is desired to carry out the polymerization. The refrigerant used in the cooling of the solution may be applied either externally or internally, but best results have been obtained using the refrigerant externally. Following the cooling operation, the solution in the form of a spray or mist produced by a suitable atomizing device is brought into contact with the olefin mixture to be polymerized. Or, if desired, the catalyst may be added dropwise to the reactant solution, with agitation. During the polymerization, the reaction mixture is usually kept under constant agitation not only as an aid to temperature control but also to prevent discoloration of the polymer. The polymer, at the polymerization temperature, generally remains in solution in the diluent. The complex formed between the catalyst (particularly AlCl₃) and the polymer may be decomposed upon completion of the polymerization reaction by the addition of agents such as water, or alcohol, or ammonia. The lower aliphatic alcohols such as methyl, ethyl, propyl, and isopropyl are particularly useful in this respect. The polymer solution may be purified by washing with water to remove catalyst residue, and the washed solution then dried and distilled, preferably under reduced pressure, to remove the solvent or diluent, and unconverted reactants. The polymer is thus obtained as the distillation residue.

The present invention may be further illustrated by the following examples, which, however, are not to be construed as limiting the scope thereof.

An initial olefinic charge comprising 25 parts by weight of propylene and 25 parts by weight of butadiene 1.3 was made up and diluted with 2.4 volumes of methylcyclohexane per 1 volume of the olefinic mixture. The diluted reactants were cooled to a temperature between —60° C. and —70° C. by the addition of solid carbon dioxide, and 85 parts by weight of a precooled solution of 1% AlCl₃ in ethyl chloride was slowly added to the cold solution of the reactants. The entire mixture was thoroughly stirred for 2 hours at a temperature between —60° C. and —70° C., such temperature being maintained by the intermittent addition of solid carbon dioxide. Upon completion of the polymerization reaction, the residual catalyst activity was killed by the addition of ethyl alcohol, and the decomposed catalyst residue was separated from the polymer solution. The solution was water washed, dried, and then distilled to remove the solvent or diluent and unreacted olefinic monomers. The desired polymer was obtained as the distillation residue and amounted to 14 parts by weight. Such polymer was a hard, yellow substance which was soluble in hydrocarbons and other solvents, and had a molecular weight of 2500 and an iodine number of 149. In order to obtain polymers having the desired characteristics, it was found that the amount of propylene employed should be within the range of 40% to 60% by weight of the propylene-butadiene mixture.

The polymer obtained as above described was added in various amounts to a partially deoiled petrolatum stock having the following properties:

Gravity A. P. I., 35°
Flash Point O. C., 500° F.
S. U. vis. at 210° F., 65 sec.
Color A. S. T. M., 5½ dil.
Melting point A. S. T. M., 155° F.
Penetration A. S. T. M.:
    At 77° F., 50/70
    At 32° F., 29
Oil content, 10%

Distillation at 10 mm.:

| Percent | °F. |
|---|---|
| Initial | 452 |
| 5 | 549 |
| 10 | 590 |
| 30 | 653 |
| 50 | 682 |

The results obtained are tabulated below.

| Composition | Consistency | Adhesiveness | Fiber Length |
|---|---|---|---|
| Petrolatum wax | firm, pasty | poor | poor. |
| Petrolatum wax+25% polymer. | soft, stringy | good | good. |
| Petrolatum wax+50% polymer. | firm, stringy | do | Do. |

From the above data, it is evident that the addition of the polymer to the wax markedly improved its adhesiveness or tackiness, as well as its fiber length. While the polymers are primarily adapted for the addition to hydrocarbon waxes which may or may not contain oil, such polymers are also suitable additives for hydrocarbon waxes blended with other agents such as high boiling halogenated hydrocarbons or halogenated waxes which lend fireproofing and other qualities to materials treated with the compositions.

While, in the preparation of the propylene-butadiene polymer above described, an inert diluent such as methylcyclohexane was employed for the olefinic mixture, and ethyl chloride was utilized as a solvent for the AlCl₃ catalyst, a variety of other diluents or solvents may be used, provided they are inert, liquid at the polymerization temperature of —50° C. to —100° C., and are readily removable from the polymer product. In lieu of methylcyclohexane, other cycloparaffins such as cyclopropane, cyclobutane, methylcyclobutane, cyclopentane, dimethylcyclohexane, and the like may be used.

In the incorporation of the polymer with the wax, the wax may be rendered liquid by heating to a temperature above its melting point, for example, 210° F. to 250° F., and the polymer added with stirring. Or, the polymer may be dissolved in a suitable solvent and added to the wax, the solvent then being removed by heating, preferably under reduced pressure. In the lamination of glassine or parchment papers, foil, regenerated cellulose, or synthetic unsupported films of various kinds, it is especially important to employ laminants having good adhesiveness, since with these smooth surfaced sheets there is much less opportunity for the laminating material to obtain anchorage in pores or around fibers than with the more fibrous paper sheets. It is in applications such as these that very tacky wax compositions of the type concerned in this invention are particularly useful.

We claim:

1. A composition comprising hydrocarbon wax and from 5% to 50% by weight of a polymer having a molecular weight between 2,000 and 4,000 and an iodine number between 125 and 175 obtained by treating a propylene-butadiene mixture with a Friedel-Crafts catalyst at a temperature between —50° C. and —100° C., the propylene comprising from 40% to 60% by weight of the propylene-butadiene mixture.

2. A composition comprising hydrocarbon wax and from 5% to 50% by weight of a polymer having a molecular weight between 2,000 and 4,000 and an iodine number between 125 and 175 obtained by treating a propylene-butadiene mixture in solution in a cycloparaffin solvent with a Friedel-Crafts catalyst in solution in an alkyl halide containing not more than 3 carbon atoms at a temperature between $-50°$ C. and $-100°$ C., the propylene comprising from 40% to 60% by weight of the propylene-butadiene mixture.

3. A composition comprising petrolatum wax and from 5% to 50% by weight of a polymer having a molecular weight between 2,000 and 4,000 and an iodine number between 125 and 175 obtained by treating a propylene-butadiene mixture in solution in methylcyclohexane with aluminum chloride in solution in ethyl chloride at a temperature between $-50°$ C. and $-100°$ C., the propylene comprising from 40% to 60% by weight of the propylene-butadiene mixture.

WILLIAM R. TURNER.
RANDALL G. HEILIGMANN.

REFERENCES CITED

The following references are of record in the file of this patent:

UNITED STATES PATENTS

| Number | Name | Date |
|---|---|---|
| 2,142,980 | Huijser et al. | Jan. 3, 1939 |
| 2,391,095 | Kellog et al. | Dec. 18, 1945 |